US008244172B2

(12) United States Patent
Evans

(10) Patent No.: US 8,244,172 B2
(45) Date of Patent: Aug. 14, 2012

(54) REMOTE HOST-BASED MEDIA PRESENTATION

(75) Inventor: Charles Evans, Corvallis, OR (US)

(73) Assignee: Marvell International Technology Ltd. (BM)

( * ) Notice: Subject to any disclaimer, the term of this patent is extended or adjusted under 35 U.S.C. 154(b) by 106 days.

(21) Appl. No.: 12/878,806

(22) Filed: Sep. 9, 2010

(65) Prior Publication Data

US 2010/0332983 A1    Dec. 30, 2010

Related U.S. Application Data

(63) Continuation of application No. 11/121,402, filed on May 3, 2005, now Pat. No. 7,801,478.

(51) Int. Cl.
*H04H 40/00* (2008.01)
(52) U.S. Cl. ............ 455/3.06; 455/41.2; 455/41.3; 700/94; 710/52; 709/238; 709/246; 709/247
(58) Field of Classification Search .......... None
See application file for complete search history.

(56) References Cited

U.S. PATENT DOCUMENTS

| | | | | |
|---|---|---|---|---|
| 5,774,798 | A | 6/1998 | Gaskill | 455/186.1 |
| 5,809,245 | A | 9/1998 | Zenda | 709/217 |
| 6,035,349 | A | 3/2000 | Ha et al. | 710/68 |
| 6,606,281 | B2 | 8/2003 | Cowgill et al. | 369/11 |
| 6,826,407 | B1 * | 11/2004 | Helferich | 455/466 |
| 6,959,448 | B1 | 10/2005 | Seo | 725/87 |
| 6,970,604 | B1 * | 11/2005 | Chai | 382/240 |
| 6,974,076 | B1 * | 12/2005 | Siegel | 235/380 |
| 7,043,479 | B2 | 5/2006 | Ireton | 1/1 |
| 7,142,934 | B2 | 11/2006 | Janik | 700/94 |
| 7,610,013 | B2 | 10/2009 | Suturdja | 455/3.06 |
| 7,711,954 | B2 * | 5/2010 | Vantalon et al. | 713/168 |
| 7,979,570 | B2 * | 7/2011 | Chapweske et al. | 709/231 |
| 2002/0013784 | A1 | 1/2002 | Swanson | 1/1 |
| 2002/0033828 | A1 | 3/2002 | Deering et al. | 345/502 |
| 2002/0037036 | A1 * | 3/2002 | Kang et al. | 375/240.01 |
| 2002/0040255 | A1 | 4/2002 | Neoh | 700/94 |
| 2002/0075816 | A1 | 6/2002 | Beckwith | 370/278 |
| 2003/0074474 | A1 | 4/2003 | Roach et al. | 709/246 |
| 2003/0220074 | A1 * | 11/2003 | Wee et al. | 455/11.1 |
| 2003/0220705 | A1 | 11/2003 | Ibey | 700/94 |
| 2004/0055446 | A1 | 3/2004 | Robbin et al. | 84/615 |

(Continued)

FOREIGN PATENT DOCUMENTS

CN    1602046 A    3/2005

(Continued)

OTHER PUBLICATIONS

A Review on Wireless Home Network Technologies by Vaxevanakis et al., Mobile Computing and Communications Review, vol. 7, No. 2, discloses a digital networked house connecting computers and other devices wirelessly.

(Continued)

*Primary Examiner* — Steven Snyder
(74) *Attorney, Agent, or Firm* — Brinks Hofer Gilson & Lione

(57) ABSTRACT

An electronic device includes a first communication interface operable to receive a decoded digital data set from an apparatus remote from the electronic device, and a first circuit coupled to the first communication interface and operable to enable an output device to provide an output representing the data set.

19 Claims, 2 Drawing Sheets

U.S. PATENT DOCUMENTS

| | | | |
|---|---|---|---|
| 2004/0160907 A1 | 8/2004 | Periman | 370/319 |
| 2004/0181667 A1 | 9/2004 | Venters et al. | 713/164 |
| 2004/0239753 A1* | 12/2004 | Proctor et al. | 348/14.04 |
| 2004/0253925 A1* | 12/2004 | Caffrey et al. | 455/63.1 |
| 2005/0123135 A1 | 6/2005 | Hunt et al. | 380/200 |
| 2005/0130586 A1 | 6/2005 | Gnuschke et al. | 455/3.06 |
| 2005/0131558 A1* | 6/2005 | Braithwaite et al. | 700/94 |
| 2005/0144253 A1 | 6/2005 | Yoshino et al. | 709/217 |
| 2005/0159830 A1 | 7/2005 | Yeh | 700/94 |
| 2005/0176451 A1* | 8/2005 | Helferich | 455/466 |
| 2005/0176452 A1* | 8/2005 | Perlman | 455/500 |
| 2005/0193017 A1* | 9/2005 | Kim | 707/104.1 |
| 2005/0273790 A1 | 12/2005 | Kearney et al. | 719/328 |
| 2006/0008166 A1* | 1/2006 | Chai | 382/240 |
| 2006/0026302 A1 | 2/2006 | Bennett et al. | 709/246 |
| 2006/0029093 A1 | 2/2006 | Van Rossum | 370/432 |
| 2006/0250282 A1 | 11/2006 | Evans | 341/50 |
| 2006/0294268 A1 | 12/2006 | Yang | 710/62 |
| 2007/0043765 A1* | 2/2007 | Chan et al. | 707/104.1 |
| 2007/0250872 A1* | 10/2007 | Dua | 725/81 |
| 2008/0034096 A1 | 2/2008 | Tourzni et al. | 709/227 |
| 2008/0175403 A1 | 7/2008 | Tan et al. | 381/77 |
| 2009/0287841 A1* | 11/2009 | Chapweske et al. | 709/231 |

FOREIGN PATENT DOCUMENTS

| | | | |
|---|---|---|---|
| JP | 2003060999 A | | 2/2003 |
| JP | 2006352196 A | * | 12/2006 |
| KR | 2002095344 A | | 12/2002 |

OTHER PUBLICATIONS

SyncTap: Synchronous User Operation for Spontaneous Network connection by Rekimoto, published online May 2, 2004, discloses the technique for establishing wireless connections between two devices. Specifically teaches using a PDS as a remote controller for a television.

*BBC Digital Radio*, printed Apr. 22, 2005, 2 pages, via www.bbc.cl.uk.digitalradio.

"Simplefi Your Digital Music," by Bill Howard, *PC Magazine*, Mar. 13, 2002.

"320D Compellor Owner's Manual," Revision 1, *Aphex Systems Ltd.*, 2003.

"Pumping on Your Stereo," by Jennifer Farwell, *Smart Computing*, vol. 8, Issue 10, Oct. 2002.

"S/PDIF Digital to Analogue Converter," by Randy McAnally and Rod Elliot, Jan. 12, 2002.

Simplefi image from *Simplefi Your Digital Music,*, Bill Howard, PC Magazine, Mar. 13, 2002, available at http://www.pcmag.com/artcile2/0,02817,15384.00.asp, (last assessed Mar. 28, 2009).

Simplefi Wireless Digital Audio Receiver Installation and user guide, Motorola, 2001 available at http://ec1.images-amazon.com/media/i3d/01/A/man-migrate/MANUAL000039006.pdf (last accessed Mar. 28, 2009).

"Choosing a PDA 3: Wireless Options" by A. Wright on Brighthand.com, Nov. 14, 2004.

"Squeezebox Owner's Guide," by Slim Devices, Inc., copyright 2003.

"IEEE 802.11b/g Wireless LAN USB Adapter User's Guide," Vesion 1.0, USB Gear, Jul. 12, 2004.

"Home Networking with Microsoft Windows XP Step by Step," by Danda et al., copyright 2001.

Atkinson, J., "Slim Devices Squeezebox WiFi D/A processor," *Stereophile*, 3 pgs. (Sep. 2006) available at http://www.stereophile.com/digitalprocessors/906slim/.

* cited by examiner

REMOTE HOST-BASED MEDIA PRESENTATION

This application is a continuation application of U.S. patent application Ser. No. 11/121,402, filed May 3, 2005 which is hereby incorporated by reference in its entirety.

BACKGROUND

Typically, in order to play media content, such as audio and/or video content, that is encoded in a compression format such as, for example, MP3 or MPEG, the content must be decompressed and converted to an analog signal by, for example, a digital-to-analog (D/A) converter. Because most personal computers (PCs) are configured to store and/or retrieve encoded media content, as well as perform decompression and D/A conversion functions, the PC is, for many, the preferred mode of playing such content. Others, however, prefer to play media content in a location remote from a PC. To this end, portable player devices, such as portable MP3 players, have become extremely popular.

An MP3 player receives and stores audio files encoded in the MP3 format from a device, such as a PC or server. The MP3 player is then able to decompress the file, convert the file to an analog signal and amplify the analog signal to allow the file to be heard via an output device, such as headphones. However, in order to reduce the cost and complexity of a conventional MP3 player, the MP3 player is solely configured to decode files formatted in MP3. If it is desired that a portable device be able to play files formatted in a variety of compression or other encoding schemes, then such device must be configured to do so. Such an increase in device capability typically entails a corresponding increase in the cost and complexity of the device attributable to additionally required hardware and/or software and, in some cases, licensing costs associated with the use thereof.

SUMMARY

According to an embodiment of the invention, an electronic device includes a first communication interface operable to receive a decoded digital data set from an apparatus remote from the electronic device, and a first circuit coupled to the first communication interface and operable to enable an output device to provide an output representing the data set.

The electronic device allows any audio or video file that the apparatus is configured to play, regardless of the compression scheme under which such file is encoded, to be output by the output device in a location remote from the apparatus

DETAILED DESCRIPTION

Figure 1:
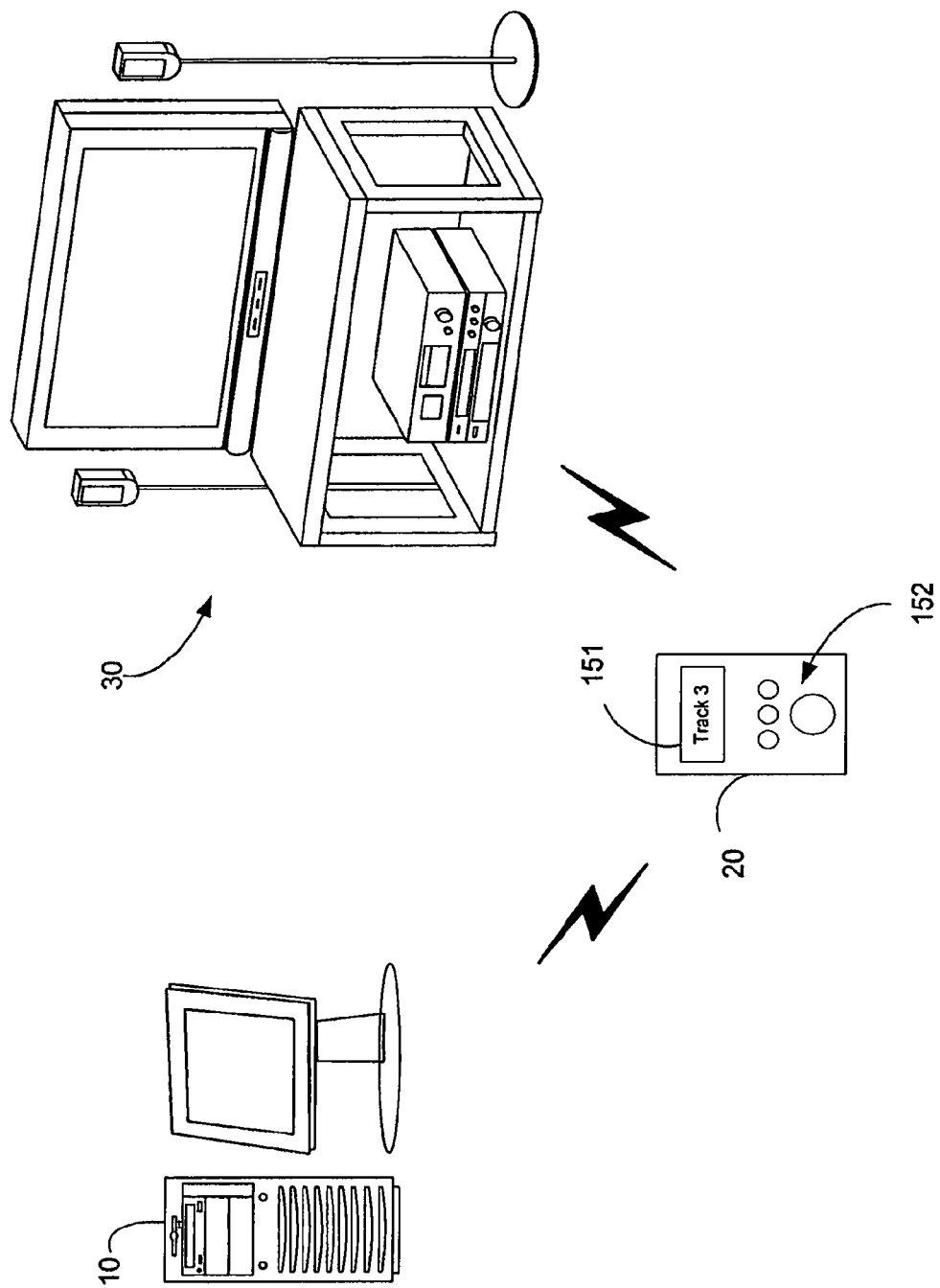
FIG. 1 is a schematic view of a system according to an embodiment of the invention.
Figure 2:
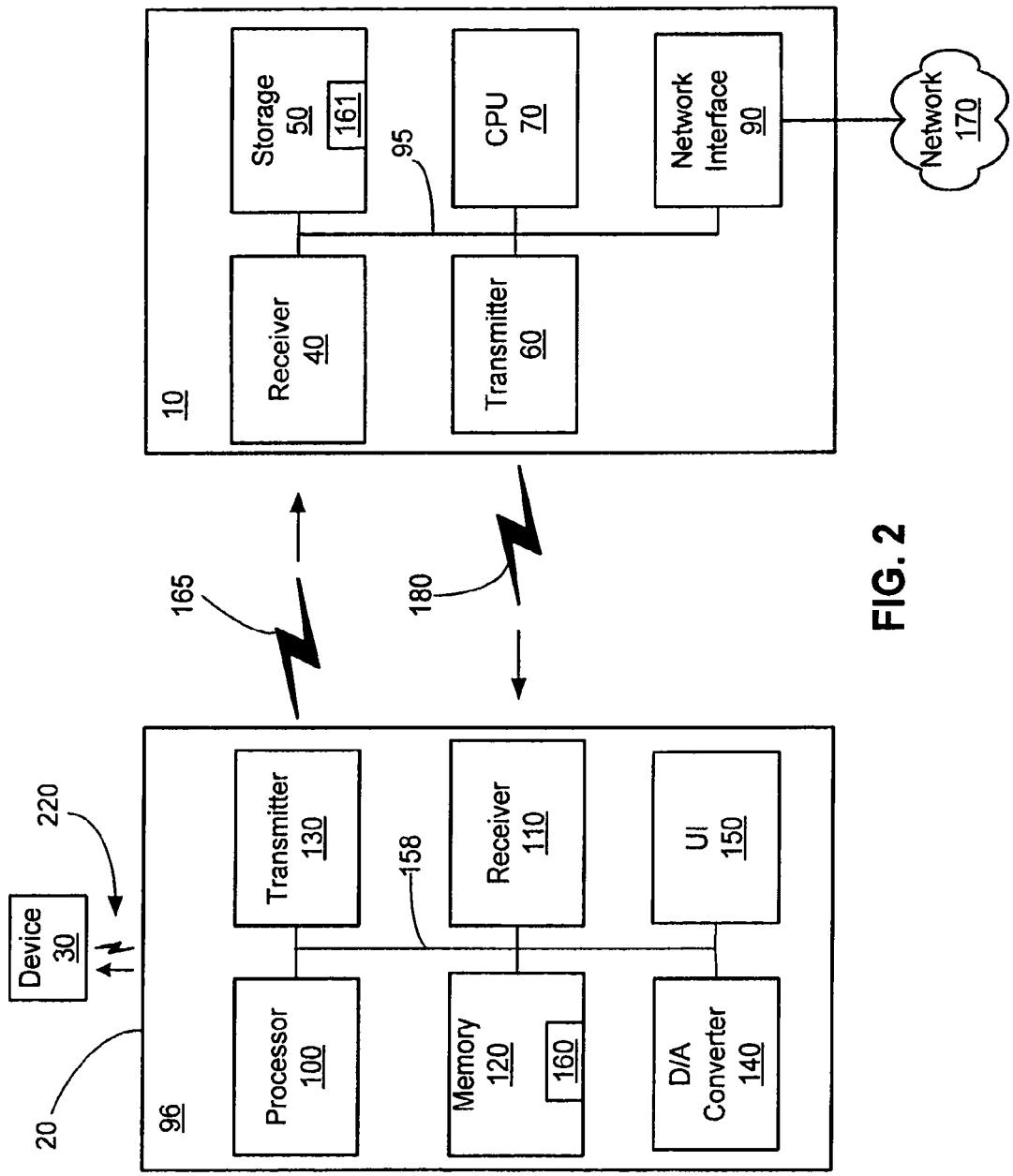
FIG. 2 is a functional block diagram of the system illustrated in FIG. 1 according to an embodiment of the invention.

FIGS. 1 and 2 illustrate an electronic system including a computer 10 and a host-based media player 20, according to one or more embodiments of the invention. The components of the computer 10 and/or media player 20 described herein are exemplary and are not intended to suggest any limitation as to the scope of use or functionality of embodiments of the invention. Embodiments of the computer 10 and/or media player 20 should not be interpreted as having any particular dependency or requirement relating to any one component or combination of components illustrated in and described with reference to FIGS. 1 and 2.

FIG. 1 is a schematic view of an apparatus, such as a personal computer 10, and an electronic device, such as a remote media player 20, according to an embodiment of the invention. As discussed more fully with reference to FIG. 2, the computer 10 is operable to decode encoded data sets, such as audio and video files and, in an embodiment, wirelessly transmit the decoded data sets to the media player 20 for subsequent output on one or more electronic output devices 30 communicatively coupled to the media player. The devices 30 may include, for example, televisions, stereo receivers, multimedia recording devices, and any other electronic device operable to provide an output representing an audio and video (multimedia) data set.

Specifically, the computer 10 is operable to access and decode an encoded file and transmit the decoded file to the media player 20 via an electromagnetic signal such as an infrared (IR) or radio frequency (RF) signal. The media player 20, in turn, is able, if necessary, to convert this data set into an analog signal that can be output as audio and/or video by the device 30. Consequently, any audio or video file that the host computer 10 is configured to play, regardless of the compression scheme under which such file is encoded, can be output by a device 30 in a location remote from the computer.

Referring to FIG. 2, the computer 10 includes the following components: a receiver 40, a storage device 50 such as a hard disk drive, a transmitter 60, a central processing unit (CPU) 70, and a network interface 90 according to an embodiment of the invention. A bus 95 couples the computer components to one another. In an alternative embodiment, the receiver 40 and/or transmitter 60 may be peripheral devices coupled to the computer 10.

The media player 20 includes a housing 96 within which are at least partially disposed the following components: a first circuit such as a processor 100, a first communication interface, such as a receiver 110, a memory 120, a second communication interface, such as a transmitter 130, a second circuit such as a D/A converter 140, and a user interface (UI) 150, which may include a display 151 (FIG. 1), such as a liquid-crystal display (LCD), and controls 152 (FIG. 1), such as buttons and/or knobs, according to an embodiment of the invention. A bus 158 couples the media player components to one another.

In operation, according to an embodiment of the invention, a user wishing to use one or more devices 30 to listen to and/or view media content stored on or otherwise accessible by the computer 10 uses the media player 20 to request such content. For example, in an embodiment, the media player 20 may have stored in the memory 120 a list 160 of content files that are stored on the computer 10 and available for retrieval. Additionally, the media player 20 is configured to present this list 160 on the display 151. Accordingly, the user, by viewing the display 151 and employing one or more controls 152, can interact with the displayed list 160 by, for example, moving a cursor among the listed files and selecting a file for retrieval by the computer 10. Alternatively, this interaction may be achieved by using, for example, a keyboard (not shown), mouse (not shown), or any other conventional input device.

Alternatively, the user, by employing one or more controls 152, may prompt the media player to retrieve from the computer 10 a list 161 of content files stored in the storage 50 and available for retrieval. Specifically, the user may operate the media player 20 such that the media player transmitter 130 transmits signals 165 to the receiver 40. Via these signals 165, the user may use the media player 20 to request that the computer 10 transmit a copy of the list 161 to the media player receiver 110 via signals 180. The signals 165 and 180 may be optical signals, such as IR signals, RF signals that conform to a communication protocol such as Bluetooth, or any other wireless signals. In a manner similar to that described above, the user may subsequently select a file for retrieval by the computer 10. Alternatively, the media player 20 and computer 10 may communicate with each other via signals transmitted over a conventional cable (not shown).

Upon user selection of a file, the media player transmitter 130 transmits signals 165 modulated to carry a request for the selected file to the receiver 40, in the computer 10. After receiving a request for the selected file from the receiver 40, the CPU 70 checks the list 161 to determine whether the list contains the content file indicated by the request. Alternatively, the CPU 70 may access, via the network interface 90, a similar list (not shown) of available content files, as well as the content files themselves, stored, for example, on a remote server (not shown) associated with a network 170 such as a local-area network (LAN) or a wide-area network (WAN) such as the Internet.

The CPU 70 then identifies the scheme under which the content file is encoded, and decodes the requested content file by executing an appropriate decompression algorithm. The transmitter 60 then transmits the decoded file via signals 180 to the receiver 110 of the media player 20. Note that the CPU 70 need not decode the entire content file prior to the transmitter 60 transmitting the file to the media player 20. Instead, portions of the content file may be sequentially decoded and transmitted and in this way the content file may be "streamed" to the media player 20.

Depending on the capabilities of the device 30 to be used to present the decoded media content, the media player 20, upon receiving the file from the computer 10, may employ the D/A converter 140 to convert the file into an analog signal. For example, if the device 30 is incapable of D/A conversion, then the user may employ the controls 152 to toggle a D/A conversion function of the media player 20 to an enabled setting. Consequently, the D/A converter 140 converts the file into an analog signal that the media player transmits to the device 30. If the device 30 is capable of D/A conversion, then the user may employ the controls 152 to toggle the D/A conversion function of the media player 20 to a disabled setting. In such a case, the media player transmits the media content in its digital form to the device 30 for subsequent D/A conversion by the device.

In an embodiment, the media player 20 transmits the media content, whether in analog or digital form, to the one or more devices 30 via signals 220. The signals 220 may be IR signals, RF signals that conform to a communication protocol such as Bluetooth, or any other wireless signals. Alternatively, the media player 20 can employ a port (not shown) to communicate the media content over a cable (not shown) to a port (not shown) of the one or more devices 30. The ports may operate according to any plug-and-socket connection standard such as Universal Serial Bus or IEEE 1394 which are known in the art, or may be configured to receive and employ conventional audiovisual-equipment cables. Where the media player 20 transmits the content to the devices 30 over a wireless communication link, the devices must include a suitable receiver, or such a receiver must be coupled to the devices.

In an embodiment, a requested audio file may include a video component. Such a video component may include, for example, animation, a still image, information pertaining to a song associated with the audio file and/or other graphics. In such case, the media player 20 may function to transmit an audio component of the file to an audio device 30 for audio output while transmitting the video component to a video device 30 for output of the graphics.

In an embodiment, if the user communicatively couples a device 30, such as a television, having a display to the media player 20, the media player may display the list of content files available for retrieval on the display of the device. The user may then use the controls 152 to move a cursor or other selection device around the display of the device 30 to select a file for retrieval.

Other embodiments of the arrangement shown in FIGS. 1 and 2 are contemplated. For example, the media player 20 and computer 10 may respectively include more or fewer than all of the components illustrated in FIG. 2. In another embodiment, the functionality of the media player 20 is split between the computer 10 and devices 30. In this embodiment, the computer 10 stores the list 160 of content files and communicates this list over a suitable communication link to the devices 30. The devices 30, in turn, display the list 160 on a suitable one of the devices, such as a television. A user then uses a conventional remote control, for example, to select the desired content file. In response to the user selecting a content file, the devices 30 communicate identification information for this file to the computer 10. The computer 10 thereafter operates as previously described to access and decode the selected content file, and to communicate the decoded data for the file to the devices 30. In this embodiment, the devices 30 must of course include circuitry for implementing the required functionality of this embodiment. This may be done through an external component (not shown in FIGS. 1 and 2) coupled to the devices 30.

The described embodiments of the invention are operational with and/or may include numerous general purpose or special purpose computing system environments or configurations. Examples of well known computing systems, environments, and/or configurations that may be suitable for use with embodiments of the invention include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

Although embodiments of the system described herein may allude, for exemplary purposes, to certain types of computer-readable media that the system includes or with which the system interacts, it should be recognized that such embodiments may include or interact with a variety of computer-readable media.

Computer-readable media can be any available media that can be included and/or accessed by the computer 10 and/or media player 20 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, DVD or other optical disk storage, magnetic cassettes, magnetic tape, magnetic disk storage or other magnetic storage devices, or any other medium that can be used to store information and that can be included and/or accessed by the computer 10 and/or media player 20. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The preceding discussion is presented to enable a person skilled in the art to make and use the invention. Various modifications to the disclosed embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

I claim:

1. A media player comprising:
    a user interface configured to receive a user input indicative of a selection of a file;
    a receiver configured to wirelessly receive the file from a device in response to the user input, the file having been previously decoded by the device prior to the device sending the file to the receiver; and
    a transmitter configured to transmit the file to an electronic output device for subsequent output by the electronic output device,
    wherein the media player is not configured to decode the file using any audio compression or encoding scheme,
    wherein a first portion of the file decoded by the device is transmitted from the transmitter to the electronic output device before the receiver receives a last portion of the file decoded by the device.

2. The media player of claim 1, wherein the user interface includes one or more of a display, a knob, a button, a keyboard, or a mouse.

3. The media player of claim 1, wherein the transmitter is configured to transmit the file to the electronic output device over a wired communication link.

4. The media player of claim 3, wherein the wired communication link comprises a Universal Serial Bus cable.

5. The media player of claim 1, wherein the transmitter is configured to transmit the file to the electronic output device over a wireless communication link.

6. The media player of claim 1, wherein the electronic output device comprises one or more of a television, a stereo receiver, or a multimedia recording device.

7. The media player of claim 1, further comprising a digital to analog (D/A) converter configured to convert the file from a digital format into an analog format prior to the transmitter transmitting the file the electronic output device.

8. The media player of claim 1, wherein the media player comprises a remote control.

9. The media player of claim 1, wherein the user interface is further configured to display a list of files that are selectable by a user.

10. The media player of claim 9, wherein the list of files is received by the media player from the device.

11. The media player of claim 1, wherein the file comprises an audio file or a video file.

12. A method comprising:
    receiving a user input indicative of a selection of a file;
    transmitting an indication of the selection of the file to a first device;
    in response to having transmitted the indication of the selection of the file, wirelessly receiving the file from the first device, the file having been previously decoded by the first device prior to the first device sending the file; and
    transmitting the file to a second device for subsequent output by the second device,
    wherein the file is not decoded using any audio compression or encoding scheme subsequent to the file being wirelessly received
    wherein a first portion of the file decoded by the first device is transmitted from the transmitter to the second device before a last portion of the file decoded by the first device is received.

13. The method of claim 12, wherein transmitting the file to the second device comprises transmitting the file over a wired communication link.

14. The method of claim 13, wherein the wired communication link comprises Universal Serial Bus cable.

15. The method of claim 12, wherein transmitting the file to the second device comprises transmitting the file over a wireless communication link.

16. The method of claim 12, wherein the file comprises an audio file or a video file.

17. The media player of claim 1, wherein the device streams the file to the receiver such that the receiver has received a first portion of the file before the device decodes a second portion of the file.

18. The media player of claim 1, wherein the file received by the media player from the device is in digital format.

19. The media player of claim 18, further comprising:
    a digital to analog (D/A) converter configured to convert the file from the digital format into an analog audio format.

* * * * *